United States Patent [19]

Aptel et al.

[11] Patent Number: 5,089,187
[45] Date of Patent: Feb. 18, 1992

[54] PROCESS FOR PRODUCING A SEMI-PERMEABLE MEMBRANE BY EXTRUSION

[75] Inventors: Philippe Aptel; Jean-Michel Espenan, both of Toulouse, France

[73] Assignee: Societe Lyonnaise des Eaux, S.A., Paris, France

[21] Appl. No.: 456,096

[22] Filed: Dec. 22, 1989

[30] Foreign Application Priority Data

Dec. 22, 1988 [FR] France ............... 88 17371

[51] Int. Cl.$^5$ ......................................... D01D 5/247
[52] U.S. Cl. ........................................ 264/41; 264/559; 264/561; 264/562; 264/184; 264/205; 264/209.1; 264/210.8; 264/211.16; 264/233; 210/500.23
[58] Field of Search .............. 210/500.23, 500.31, 210/500.41; 264/41, 209.1, 559, 561, 562, 184, 205, 210.8, 211.16, 233

[56] References Cited

U.S. PATENT DOCUMENTS

| | | | |
|---|---|---|---|
| 4,234,431 | 11/1980 | Mishiro et al. | 210/500.23 |
| 4,481,260 | 11/1984 | Nohmi | 210/500.23 |
| 4,612,119 | 9/1986 | Eguchi | 210/500.23 |
| 4,681,713 | 7/1987 | Miyagi et al. | 210/500.23 |
| 4,822,489 | 4/1989 | Nohmi et al. | 210/500.23 |

FOREIGN PATENT DOCUMENTS

| | | | |
|---|---|---|---|
| 0195860 | 10/1986 | European Pat. Off. | 210/500.23 |
| 3022313 | 12/1980 | Fed. Rep. of Germany | |
| 2445163 | 8/1980 | France | |
| 2616812 | 12/1988 | France | 210/500.23 |
| 59-82906 | 5/1984 | Japan | |
| 8102750 | 10/1981 | World Int. Prop. O. | |

*Primary Examiner*—Hubert C. Lorin
*Attorney, Agent, or Firm*—Harold H. Dutton, Jr.

[57] ABSTRACT

A process for the production of a porous organic material, in particular a semi-permeable membrane, comprising a plurality of separate passageways, including dissolving a polymer in a solvent, using a drawplate having needles of a shape conjugate with those of the passageways and of external dimensions between 0.7 and 1.2 times those of the passageways and an extrusion orifice of a shape conjugate those of the extrudate and of internal dimensions comprising between 0.8 and 1.2 times those of the extrudate, injecting around the needles a solution having a viscosity greater than 500 mPa.s and introducing a centering fluid into the interior of these needles, recovering the extrudate at the output of the drawplate in a precipitating medium in such a manner that the extrudate travels in the medium a distance such that $800 \times e < de < 3$ m, (e representing the maximum distance of travel for a precipitaing fluid for obtaining complete precipitation of the extrudate), and taking up the precipitated extrudate with a linear take-up speed Ve such that $Ve/Vs < 1.2$ (Wv representing the average speed of the extrusion).

8 Claims, 1 Drawing Sheet

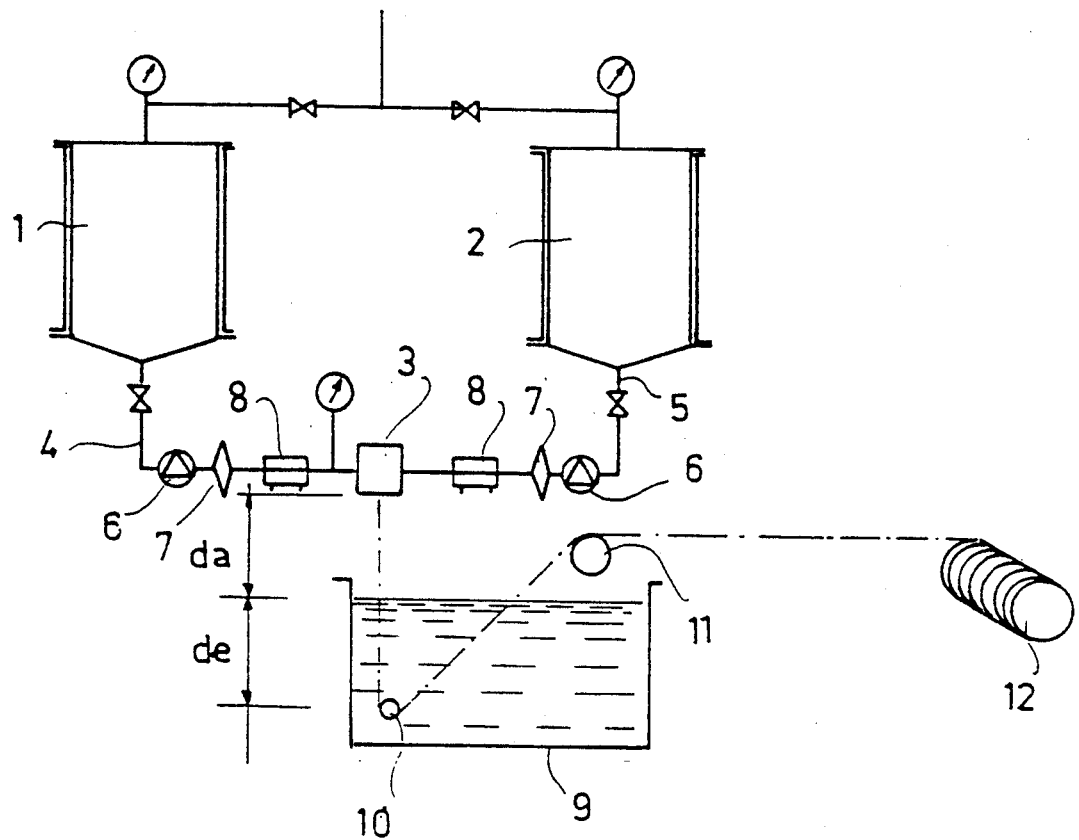
Fig. 2
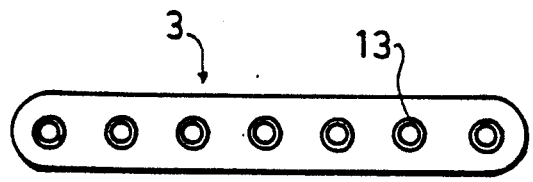

PROCESS FOR PRODUCING A SEMI-PERMEABLE MEMBRANE BY EXTRUSION

This invention relates to a process for the production of a porous organic material, in particular an organic semi-permeable membrane comprising a plurality of separate longitudinal passageways, the process being of the type comprising dissolving a polymer in a solvent, extruding the solution obtained through an extrusion die provided with a plurality of separate conduits on the interior of which is introduced a centering fluid, and on the exterior of which the solution flows, and finally precipitating the extrudate obtained.

BACKGROUND AND OBJECTS OF THE INVENTION

Organic semi-permeable membranes provided with a plurality of separate longitudinal passageways have several advantages with respect to conventional hollow fibers. In effect, they have a high mechanical strength which notably simplifies problems of handling. Moreover, the speeds of production are accelerated due to the fact that a lesser length of membrane is necessary for the production of a bundle. Finally, the provision of filtration modules is greatly simplified. Such advantages have led to a the development of use of these membranes of which the production techniques or the applications are particularly described in the following patents: DE-A-3 022 313; WO-A-8102750; FR A-2,445,163 and JP 5,982,906. However, known techniques and particularly those described in these patents do not permit mastering in a rational manner all of the parameters of production of these membranes and conferring thereon particular predefined structures or mastering in a very precise manner the external dimensions of these membranes as well as their passageways.

The present invention seeks to overcome these deficiencies and has as its principal object to provide a process permitting production of membranes having particularly well defined structures and of which the dimensions, as well as those of their passageways, are precisely defined.

DESCRIPTION OF THE INVENTION

Thus, the invention comprises a process characterized in:

using a drawplate or extrusion plate comprising needles of shapes conjugate to those of the passageways and of external dimensions comprising between 0.7 and 1.2 times those of the passageways and an extrusion orifice of a shape conjugate to that of the extrudate and having internal dimensions between 0.8 and 1.2 times those of said extrudate, arranging the drawplate in such a manner as to extrude the solution essentially vertically, injecting around the needles a solution having a viscosity greater than 500 millipascal seconds (as measured with a "Contraves" Rheomat 115, rate of shearing of 28 $s^{-1}$) with a flow rate adapted in such a manner as to obtain an average speed of extrusion Vs at the output of the extrusion plate, recovering the extrudate from the output of the drawplate in a medium which is a non-solvent with respect to the polymer and able to precipitate the polymeric solution, in such a manner that the extrudate travels in the medium a distance $d_e$ such that $800 \times e < d_e < 3$ m where e represents the maximum distance of travel by the precipitating fluid on the interior of the extrudate for obtaining the complete precipitation of the extrudate, and taking up the precipitated extrudate with a linear take-up speed Ve such that Ve/Vs<1.2.

This process permits production of a membrane in which the polymeric material is composed of an active layer on the surface of the membrane and of an intermediate thickness of a porosity greater than that of the active layer.

The interest in such membranes resides in the fact that an active layer constitutes a filtration screen avoiding that the filtration would take place in the depth of the polymeric material and at the same time the membranes do not become irreversibly saturated.

Further, all of the operative conditions carried out in this process are adapted to obtain the complete precipitation of the membrane before it can encounter an obstacle which would tend to deform it, while precisely controlling the stretching phenomena of the extrudate which conditions the external dimensions of this membrane as well as those of the passageways.

According to a first preferred embodiment, a centering fluid which is non-precipitating with respect to the polymeric solution is introduced into the conduits of the drawplate. The membrane produced thus has a single active layer on its external surface.

This process is especially very advantageous when the membranes produced are planar as the latter may then replace a portion of the stack in the modules of a filter press.

In this case, the centering fluid used is preferably a solution miscible with the precipitating fluid and able to have a liquid state above a predetermined temperature tg, and pass to a gel state below said temperature. This solution is heated to a temperature greater than tg in such a manner as to be introduced in the liquid state into the conduits of the drawplate, then the temperature is lowered at the output of the drawplate in such a manner as to gel the liquid.

The utilization of such a solution as well as the centering fluid permits rigidifying the extrudate at the output of the drawplate and thus assuring a better support thereof and assuring obtaining precisely formed passageways.

In addition, one may also preferably cause the extrudate to travel a distance less than 0.3 m in a gaseous atmosphere which is non-precipitating with respect to the polymeric solution, before recovery in the precipitating medium.

This passage in a non-precipitating gaseous atmosphere presents two advantages: first, it permits stretching however slight the extrudate and consequently causing a variation in a controlled manner the external dimensions of the membrane. Secondly, it permits obtaining a rearrangement of the polymeric material forming the extrudate before precipitating the latter, and especially eliminating the inflation to which this polymeric material is generally subjected at the output of the drawplate.

According to a second preferred embodiment, the centering fluid introduced into the conduits of the drawplate is a non-solvent fluid with respect to the polymer and is able to precipitate the polymeric solution.

The membrane produced has not only an active layer on its external surface but also active layers on the surface of each passageway.

The advantages of such membranes are of three types: in the first place, they may function with a liquid circulating in the passageways or circulating on the exterior of the membrane and are therefor very easily washable. Further, they have a very good mechanical strength. Finally, such membranes permit preventing, in the case of microfiltration or ultrafiltration, the proliferation of bacteria on the interior of the polymeric material which may cause the saturation of the membrane or even destroy the same if the latter is biodegradable.

Further, as for the first preferred embodiment, and in the same goal, the extrudate may be advantageously caused to travel a distance of less than 500 c in a gaseous atmosphere before the recovery in the precipitating medium, c representing the minimum distance between the surface of the passageways and the external surface of the extrudate.

Finally, a third embodiment may comprise introducing into the different conduits of the drawplate centering fluids of different natures in such a manner as to obtain passageways with different surface porosities.

DESCRIPTION OF THE DRAWINGS

The invention will be better understood from a reading of the detailed description which follows, when taken together with the accompanying drawings which show by way of nonlimiting example a prefered embodiment of the invention. In these drawings which form an integral part of the present description:

FIG. 1 is a schematic diagram illustrating a production process according to the invention; and FIG. 2 is a schematic view of the face of the drawplate used in the example of operation described in the description.

DETAILED DESCRIPTION OF PREFERRED EMBODIMENTS

The polymeric solution obtained by dissolving a polymeric material in a solvent is initially stored in a reservoir 1. In a parallel manner, a centering fluid is stored in a reservoir 2.

Each of these reservoirs 1, 2 is connected to a drawplate or extrusion plate 3 by means of feed conduits 4, 5 arranged so that the centering fluid flows through the interior of needles of this drawplate 3 and the polymeric solution on the exterior of these needles.

The drawplate 3 comprises needles of a shape conjugate with that of the passageways of the membrane to be produced and of external dimensions comprising between 0.7 and 1.2 times that of said passageways. They comprise further an extrusion orifice of a shape conjugate with that of the extrudate, that is, of a cylindrical shape for the production of a cylindrical membrane or of a rectangular shape of lesser length than width for the production of a planar membrane. The internal dimensions of this extrusion orifice comprise between 0.8 and 1.2 times that of the membrane to be produced.

Further, each of these passageways is provided with a circulation pump 6, a filter 7 and a heat exchanger 8 adapted to maintain constant the temperature of the fluid and the solution.

Directly below this drawplate 3, and arranged in such a manner as to extrude the solution essentially vertically, is a recovery tank filled with a liquid which is a non-solvent with respect to the polymer and able to precipitate the polymeric solution. The recovery tank 9 is positioned a distance from the drawplate 3, such that the extrudate travels a distance da before reaching the surface of the liquid.

In the bottom of this tank 9 is arranged a return pulley 10 permitting guiding the membrane through another reversing pulley 11 toward a take-up spool 12. The linear take-up speed Ve of this spool 12 is controlled as a function of the average extrusion speed Vs at the output of the drawplate 3 in such a manner that Ve/Vs<1.2.

The first return pulley 10 is itself arranged in the recovery tank 9 at a depth such that the extrudate travels vertically for a distance in the liquid before coming into contact with this return pulley.

Three examples of carrying out the process for the production of a planar membrane having seven passageways are described below.

As shown schematically in FIG. 2, the drawplate 3 used has an essentially rectangular cross-section of which the extrusion orifice comprises a linear length of 12.8 mm and a width of 2 mm. On the interior of this drawplate 3 are arranged seven needles 13 of an external diameter of 0.81 mm and of an internal diameter of 0.51 mm. The distance separating two needles 13 is 0.89 mm.

EXAMPLE 1

An example of the production of a membrane comprising an active layer on the external surface.

In this case and with a drawplate such as described above, the maximum distance of travel by the precipitating fluid is on the order of 1 mm.

In this example, the recovery tank 9 is filled with water and has been placed in such a manner that the distance da is 0.5 cm, while the return pulley 10 is arranged in this tank 9 at a depth such that de=102 cm.

The polymeric solution has the following composition (in mass percent):

| AMOCO "UDEL 3500" Polysulfone | 28% |
|---|---|
| TRITON surfactant 100 | 30% |
| (NMP) | 42% |

At an extrusion temperature of 25° C., this solution has a viscosity of 127,000 m.Pa.s with a Contrave Rheomat 115 at a shear rate of 28 s$^{-1}$. Further, it is extruded with a flow rate Qs=50 cm$^3$/mn.

The non-precipitating centering fluid has the following composition in percent by mass:

| NMP | 95% |
|---|---|
| Water | 5% |

It is introduced into the needles 13 with a flow rate Qf=40 cm$^3$/mn.

Finally, the take-up spool 12 is controlled in such a manner that the take-up speed Ve is 2.4 m/mn.

Under these conditions, the product obtained is a membrane comprising seven passageways not having active layers on their surface, but having an active layer on the external surface and an intermediate layer having a porosity greater than than of the active layer.

This membrane has a width of 12.9 mm and a thickness of 2.2 mm, the internal diameter of each of the passageways being 0.85 mm. Finally, the value of the hydraulic permeability, measured with a fluid flowing on the exterior of the membrane, is $1.8 \times 10^{-10}$ m/s.Pa for water at 25° C. and a P of $0.1 \times 10^5$ Pa to $1 \times 10^5$ Pa.

EXAMPLE 2

An example of the production of a membrane comprising an active layer on the external surface.

The drawplate used is the same as in Example 1. The composition of the polymeric solution is also the same. However, it is extruded at a temperature of 70° C. at which it has a viscosity of 9,000 m.Pa.s measured with a Contraves Rheomat 115, at a shear rate of 28 $s^{-1}$.

The other parameters are as follows:
da=0.5 cm
de=102 cm
Qs=50 $cm^3$/mn
Qf=40 $cm^3$/mn
Vc=2.4 m/mn.

The centering fluid comprises polyethylene glycol of an average molar mass of 10,000, of which the fusion point is 60° to 62° C. At the extrusion temperature of 70° C. this fluid is therefor a liquid, while it solidifies rapidly in air and in water which is at a temperature of 30° C.

It should be noted that this centering fluid is eliminated after the extrusion, by rinsing with water at a temperature greater than the temperature tg, on the order of 80° C.

The membrane obtained has, as in Example 1, an active layer on its external surface. Its dimensions are 12.9 mm by 2.2 mm, and the diameter of the passageways is 0.81 mm. Finally, the permeability of this membrane, measured with a fluid flowing on the exterior thereof is $1.6 \times 10^{-10}$ m/s.Pa for water at 25° C. and a P of $0.1 \times 10^5$ Pa to $1 \times 10^5$ Pa.

EXAMPLE 3

An example of the production of a membrane comprising an active layer on the surface of each passageway, and an active layer on its external surface.

In this case, and again with the same drawplate, the maximum distance travelled by the precipitating fluid is on the order of 0.5 mm as the centering fluid is itself precipitating.

The other parameters are:
da=2.8 cm
de=82 cm
Ve=1.6 m/mn
Qs=33.5 $cm^3$/mn at 40° C.
Qf=38.9 $cm^3$/mn
Vc=2.4 m/mn.

The polymeric solution has the following composition in mass percent:

| | |
|---|---|
| cellulose diacetate (EASTMAN E398-10) | 20% |
| ethylene glycol | 30% |
| N-methylpyrrolidone | 50% |

Its viscosity is 370,000 m Pa.s at the extrusion temperature of 40° C.

The precipitating centering fluid is water.

Under these conditions, the product obtained is a membrane comprising seven passageways and comprising an active layer on the surface of each passageway, an active layer on its surface, and an intermediate thickness of a porosity greater than that of said active layers.

This membrane has a width of 12.9 mm, a thickness of 2.4 mm, the internal diameter of the passageways being 1.05 mm. Finally, the value of the hydraulic permeability measured with a fluid flowing in the passageways is $3.6 \times 10^{-10}$ m/s.Pa for water at 25° C. and a P of $0.1 \times 10^5$ to $1 \times 10^5$ Pa.

We claim:
1. A process for the production of a porous organic semi-permeable membrane comprising providing a drawplate (3) having a plurality of separate extrusion openings (13) and a plurality of needles in said openings, dissolving a polymer in a solvent to form a solution of said polymer, extruding said solution essentially vertically through said openings while injecting a centering fluid through said needles in such a manner as to form an extrudate having a plurality of longitudinal passageways, recovering the extrudate at the outlet of the drawplate in a medium which is a non-solvent with respect to the polymer and able to precipitate the polymeric solution after allowing said extrudate to travel in said medium a distance de such that $900 \times e < de < 3$, where e represents the maximum distance of travel in meters of a precipitating fluid flowing on the interior of the extrudate, for obtaining a complete precipitation of said extrudate, said needles (13) having a shape conjugate with said openings and external dimensions between 0.7 and 1.2 times those of said openings, and said openings having a shape conjugate to that of the extrudate and internal dimensions between 0.8 and 1.2 times those of said extrudate, said solution having a viscosity greater than 500 millipascal seconds ("Contraves" Rheomat 115, rate of shear of 28 $s^{-1}$) and a flow rate adjusted so as to obtain an average speed of extrusion Vs at the outlet of the drawplate, and taking up the precipitated extrudate at a linear take-up speed Ve such that Ve/Vs<1.2, whereby the operative conditions of the process precisely control the stretching phenomena of the extrudate.

2. A process as in claim 1 and wherein said centering fluid is non-precipitating with respect to the polymeric solution.

3. A process as in claim 2 and including causing the extrudate to travel a distance da<0.3 m in a gaseous atmosphere which is non-precipitating with respect to the polymeric solution before recovery of the extrudate in the precipitating medium.

4. A process as in claim 2 and and wherein said solution is miscible with the centering fluid and has a liquid state above a predetermined temperature $t_g$ and passing to a gel state below said temperature, heating said centering fluid to a temperature greater than $t_g$ and introducing said centering fluid into said needles in a liquid state.

5. A process as in claim 4 and including removing the centering fluid after extrusion by rinsing the membrane with water heated to a temperature greater than $t_g$.

6. A process as in claim 1 and wherein said centering fluid is a non-solvent with respect to the polymer and is able to precipitate the polymeric solution.

7. A process as in claim 6 and including causing the extrudate to travel a distance da in a gaseous atmosphere which is non-precipitating with respect to the polymer before recovery of the extrudate in the precipitating medium, and wherein da<500c wherein c is the minimum distance between the surface of the passageways and the external surface of the membrane, and wherein the units of da and c are the same.

8. A process as in claim 1 and including introducing different centering fluids into the different conduits (13) of the drawplate (3) so as to obtain passageways of different surface porosities.

* * * * *